(12) United States Patent
Kovac

(10) Patent No.: US 7,380,326 B2
(45) Date of Patent: Jun. 3, 2008

(54) METHOD OF ATTACHING A SELF-ATTACHING FASTENER TO A PANEL

(75) Inventor: Zdravko Kovac, Chesterfield, MI (US)

(73) Assignee: Whitesell International Corporation, Taylor, MI (US)

( * ) Notice: Subject to any disclaimer, the term of this patent is extended or adjusted under 35 U.S.C. 154(b) by 0 days.

(21) Appl. No.: 11/265,024

(22) Filed: Nov. 2, 2005

(65) Prior Publication Data

US 2007/0098519 A1    May 3, 2007

(51) Int. Cl.
*B23P 11/00* (2006.01)
*B21D 39/00* (2006.01)

(52) U.S. Cl. .......... 29/505; 29/509; 29/522.1; 29/525.05; 29/243.5; 403/280; 403/282; 411/180; 72/467; 72/476

(58) Field of Classification Search .......... 29/432, 29/432.1, 432.2, 505, 509, 522.1, 524.1, 29/525.01, 525.05, 525.06, 798, 243.5, 243.53; 403/280, 282, 283; 411/179, 180, 181; 72/466.4, 72/467, 469
See application file for complete search history.

(56) References Cited

U.S. PATENT DOCUMENTS

| | | | |
|---|---|---|---|
| 2,147,763 A | 2/1939 | Becker | |
| 2,465,534 A | 3/1949 | Havener | |
| 4,430,034 A | 2/1984 | Fujikawa | |
| 4,543,701 A | 10/1985 | Müller | |
| 4,915,558 A | 4/1990 | Müller | |
| 5,140,735 A | 8/1992 | Ladouceur | |
| 5,174,018 A | 12/1992 | Müller | |
| 5,207,588 A | 5/1993 | Ladouceur et al. | |
| 5,868,535 A * | 2/1999 | Ladouceur | 411/181 |
| 6,108,893 A | 8/2000 | Wojciechowski et al. | |
| RE38,061 E * | 4/2003 | Ladouceur | 29/509 |
| 6,546,613 B2 | 4/2003 | Donovan | |
| 6,647,608 B2 * | 11/2003 | Wojciechowski et al. | 29/515 |
| 6,842,962 B1 | 1/2005 | Blacket | |
| 6,910,263 B2 | 6/2005 | Naito | |
| 2004/0010903 A1 | 1/2004 | Edwards | |
| 2004/0261259 A1 | 12/2004 | Naito | |
| 2005/0086799 A1 | 4/2005 | Kato et al. | |

FOREIGN PATENT DOCUMENTS

| | | |
|---|---|---|
| EP | 0 438 105 B1 | 3/1994 |
| EP | 1 294 504 B1 | 9/2004 |
| EP | 1 000 250 B1 | 3/2005 |
| EP | 1 512 877 A2 | 3/2005 |

* cited by examiner

*Primary Examiner*—Jermie Cozart
(74) *Attorney, Agent, or Firm*—Howard & Howard Attorneys, P.C.

(57) ABSTRACT

A self-attaching fastener and panel assembly wherein the free end of the tubular barrel portion is coined and deformed axially and radially outwardly against a planar die face into an annular shape having a planar annular bearing surface supporting the panel and a flat end face. The die includes a central post and an annular planar die surface extending substantially perpendicular to the longitudinal axis of the die member. The method of installation includes coining and deforming the barrel portion axially and radially eliminating cracking of the barrel, frictional resistance and hoop-stress.

12 Claims, 3 Drawing Sheets

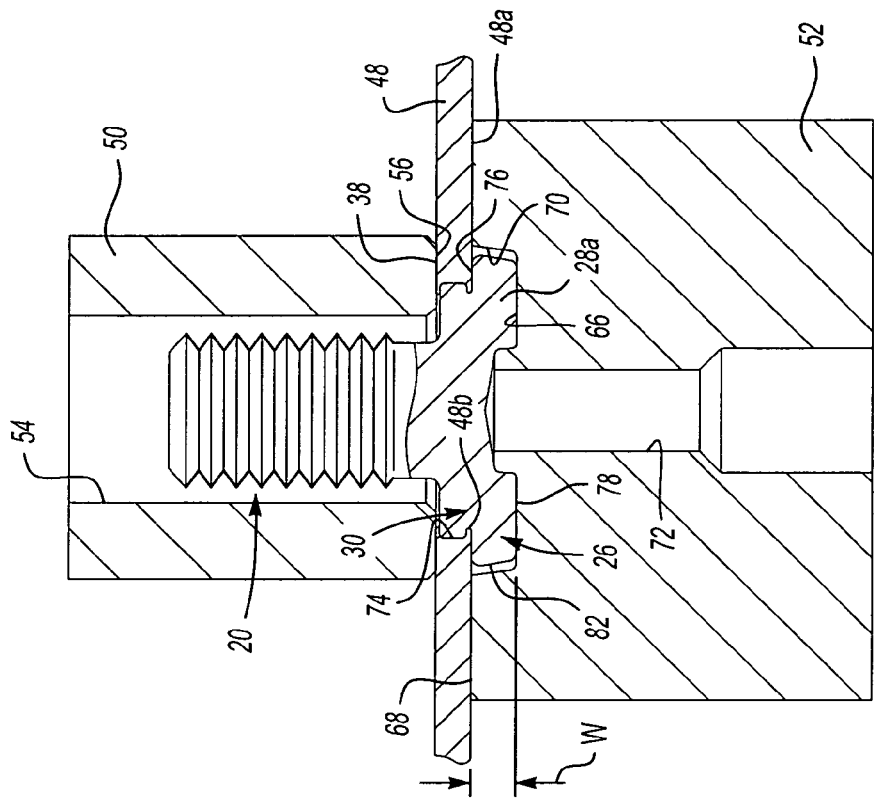
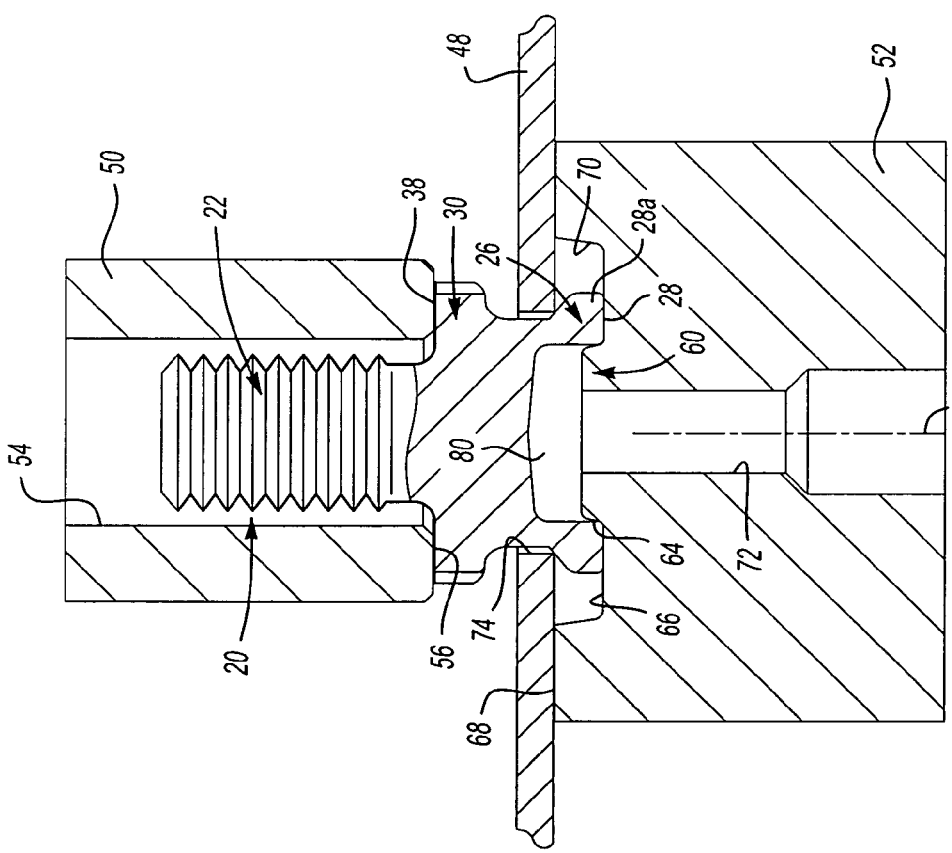

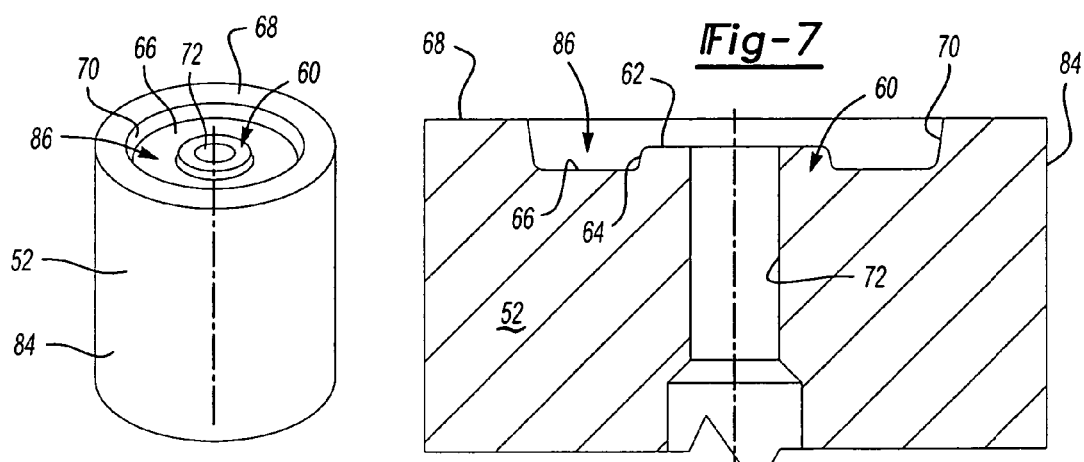
*Fig-6*  *Fig-7*
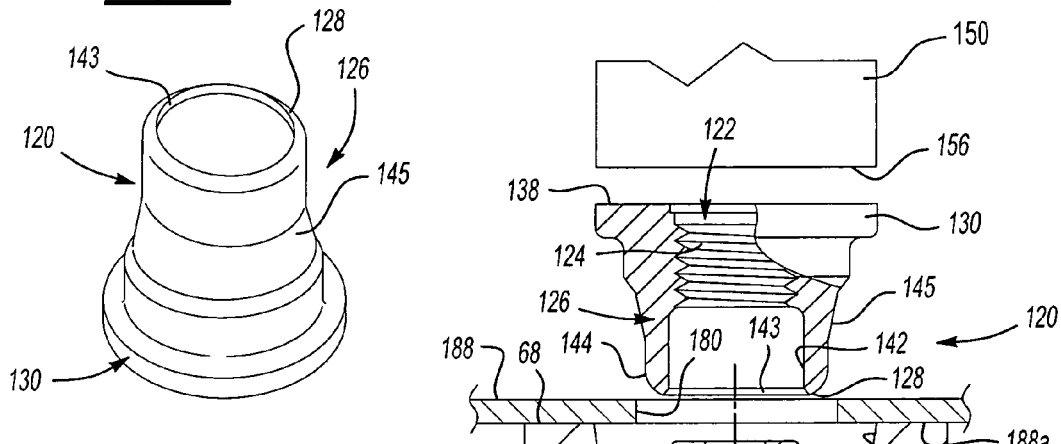
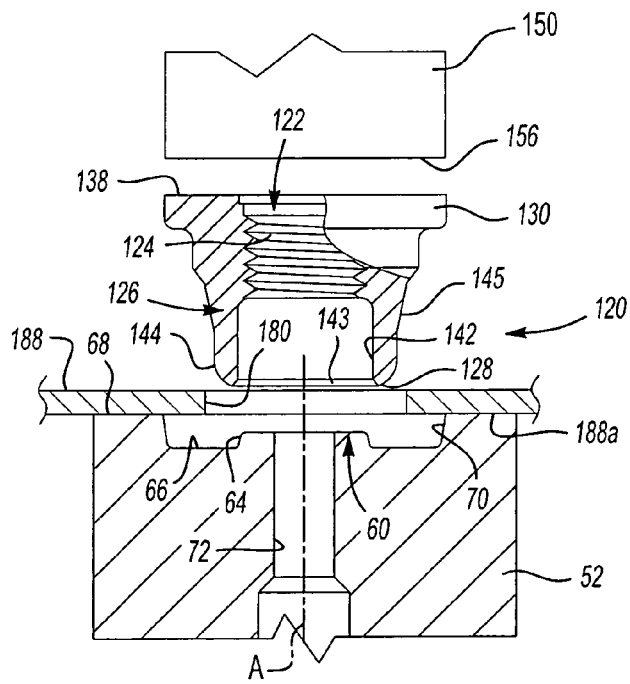
*Fig-8*  *Fig-9*
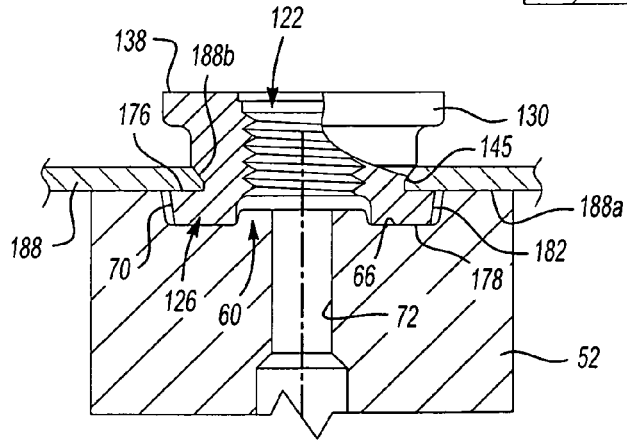
*Fig-10*

METHOD OF ATTACHING A SELF-ATTACHING FASTENER TO A PANEL

FIELD OF THE INVENTION

This invention relates to a self-attaching fastener and panel assembly, wherein the fastener is permanently attached to a panel, a method of attaching a self-attaching fastener to a panel and a die member adapted to form the self-attaching fastener and panel assembly and method of this invention.

BACKGROUND OF THE INVENTION

The predecessor in interest of the assignee of this application, Multifastener Corporation, first invented self-attaching fasteners over 50 years ago. As used herein, the term self-attaching fastener includes male and female self-piercing and self-clinching fasteners which are permanently attached to a panel, including pierce and clinch nuts. studs, bolts and the like, and pierce and clinch nuts and other female fasteners of this type. Self-attaching fasteners include a fastener portion, such as a threaded or unthreaded shank portion in the case of male fasteners, or a threaded or unthreaded bore in the case of female fasteners. In a typical application, self-attaching fasteners are fed to an installation head generally located in the upper die shoe or die platen of a die press and a die member or die button is located in the lower die shoe or die platen. The installation head typically includes a plunger which reciprocates through a plunger passage during installation to permanently install a self-attaching fastener in a panel supported on the die button with each stroke of the press. As will be understood by those skilled in this art, however, this arrangement may be reversed and self-attaching fasteners may be installed in any type of press.

Self-attaching fasteners of the type disclosed herein were first disclosed in U.S. Pat. No. 4,543,701 assigned to the predecessor in interest of the assignee of this application, the disclosure of which is incorporated herein by reference. Self-attaching fasteners of this type include a fastener portion and a tubular barrel portion having an open free end which is driven through an opening in the panel and deformed radially outwardly by a die button to permanently attach the fastener to the panel. In the embodiment of the self-attaching fastener and panel assembly and method of installation disclosed in this patent, the free open end of the tubular barrel portion is deformed radially outwardly into an L-shape and the panel is entrapped between a radial flange of the self-attaching fastener and the L-shaped barrel portion. However, this fastener and panel assembly did not provide sufficient integrity for commercial applications. U.S. Pat. No. 4,915,558, also assigned to a predecessor in interest of the assignee of this application, the disclosure of which is incorporated herein, discloses an improved method of installation, assembly and die member, wherein the free open end of the tubular barrel portion is deformed radially and upwardly into an annular channel-shape or inverted and the panel surrounding the opening is deformed into the annular channel-shaped barrel portion to permanently attach the self-attaching fastener to the panel. The die button disclosed in this patent includes a central die post and an annular concave hemispherical die surface which receives the free end of the tubular barrel portion and deforms the barrel portion into an annular channel-shape. Simultaneously, the panel portion surrounding the panel opening is driven into the developing channel-shaped barrel portion forming a very secure installation. The embodiment of the self-attaching fastener and panel assembly disclosed in this patent has been and continues to be commercially successful.

There are, however, problems associated with the method of installation disclosed in the above-referenced U.S. Pat. No. 4,915,558. First, the tubular barrel portion is subject to cracking as the barrel portion is deformed against the annular hemispherical die surface, particularly if the roll over diameter exceeds a certain size. As will be understood, the barrel portion is subject to significant frictional resistance and hoop-stress as the barrel portion is deformed against the annular hemispherical die surface and deformed into the annular hemispherical shape. To reduce the frictional resistance, the barrel portion is coated with a lubricant, increasing the cost. Further, the complex die buttons are relatively expensive to manufacture because of the configuration of the annular concave hemispherical die surface which must be polished to minimize friction between the barrel and the self-attaching fastener and the dimensions are critical to proper installation. Another problem with the installation disclosed in this patent is that the barrel cracks during installation. It is also important to note that many applications of self-attaching fasteners do not require piercing an opening in the panel with the free end of the barrel portion. Instead, an opening in the panel is prepierced or prepunched, the tubular barrel portion is received through the preformed opening and clinched to the panel as disclosed in the above-referenced patent.

The method of installing a self-attaching fastener of this invention substantially eliminates cracking of the barrel of the fastener and panel assembly, reduces the cost of the fastener by eliminating the requirement for a lubricant on the barrel and significantly reduces the cost and increases the life of the die button which is less expensive, simple and rugged in design.

SUMMARY OF THE INVENTION

As set forth above, this invention relates to a self-attaching fastener and panel assembly, a method of permanently attaching a self-attaching fastener to a panel and a relatively inexpensive rugged die button which may be utilized to form the self-attaching fastener and panel assembly of this invention using the method of installation of this invention. As also set forth above, the term self-attaching fastener as used herein includes both male and female fasteners including self-piercing fasteners, wherein the barrel portion is utilized to pierce an opening in the panel and self-clinching fasteners, wherein an opening is preformed in the panel prior to permanently installing the fastener in the panel opening. As discussed further below, although the method of installing a self-attaching fastener in a panel of this invention does not require piercing the panel with the barrel portion, it is believed that the method of this invention can also be used in a self-piercing application.

The self-attaching fastener and panel assembly of this invention includes a self-attaching fastener having a central fastener portion, a radial flange portion extending radially from the fastener portion coaxially aligned with the fastener portion and a coined annular barrel portion integral with the fastener portion coaxially aligned with the fastener portion having a diameter greater than the radial flange portion including a planar annular radial bearing surface adjacent to and surrounding the radial flange portion. The panel of the fastener and panel assembly includes an opening receiving the barrel portion and the panel has a planar panel portion surrounding the opening overlying and engaging the planar annular radial bearing surface of the annular barrel portion. As set forth below with regard to the method of installation of this invention, one important advantage of the fastener and panel assembly and method of this invention is that the self-attaching fastener may be identical to the self-attaching fasteners disclosed in the above-referenced U.S. Pat. No. 4,915,558. That is, as described further below, the self-attaching fastener may include a tubular barrel portion having substantially cylindrical internal and external surfaces prior to installation. As used herein, the term "coined" refers to a process by which a tubular barrel portion, for example, is deformed axially or flattened. However, in a preferred embodiment of this invention, the barrel portion is also coined or deformed radially outwardly to form a planar annular radial bearing surface adjacent to and surrounding the annular flange portion which is driven against a planar panel portion surrounding the panel opening.

In a preferred embodiment of the self-attaching fastener and panel assembly, the annular barrel portion includes a substantially planar end face which, in the disclosed embodiment, is substantially parallel to the planar annular radial bearing surface. This is a result of the coining process in a preferred method of attaching the self-attaching fastener to a panel. The flat annular end surface also has other advantages. First, the planar end face of the annular barrel portion is rugged and not subject to deformation following assembly. Further, the planar end face is also cosmetically appealing. Finally, the coined barrel portion is not subject to cracking and provides a very secure installation.

In one preferred embodiment of the self-attaching fastener and panel assembly of this invention, the radial flange portion is received within the opening through the panel and the planar panel portion engages the outer surface of the radial flange portion. In one preferred embodiment, the radial flange portion is driven into the inner surface of the panel opening or vice versa. Further, in a preferred embodiment of the self-attaching fastener and panel assembly, the annular barrel portion is adjacent to, but spaced from the radial flange portion and the panel adjacent the panel opening is deformed between the annular barrel portion and the radial flange portion providing improved push-through strength. Although the width or thickness of the annular barrel portion will depend upon the depth of the die surface or moat and the length of the tubular barrel portion, as described below, in one preferred embodiment, the annular barrel portion is thicker or has a greater width than the thickness or width of the radial flange portion. As set forth above, the self-attaching fastener of this invention may be either a male or female fastener, In one preferred embodiment of the male self-attaching fastener, the fastener includes a shank portion extending from and coaxially aligned with the radial flange portion. In another preferred embodiment, the fastener portion includes a body portion having a threaded or unthreaded bore therethrough coaxially aligned with the annular barrel portion. As also described further hereinbelow, a preferred embodiment of the die member includes a moat having a planar die surface, wherein the radial deformation or coining of the annular barrel portion is "uncontrolled." That is, the diameter of the moat is greater than the radial diameter of the annular barrel portion and thus the diameter of the annular barrel portion will depend upon the longitudinal or axial length of the tubular barrel portion and the depth of the moat.

The method of attaching a self-attaching fastener to a panel of this invention comprises the following steps. First, the method of this invention includes forming a fastener having a fastener portion and a tubular barrel portion integral and coaxially aligned with the fastener portion having a free open end. The method of this invention further includes forming an opening through a panel having a diameter equal to or greater than the diameter of the tubular barrel portion. As set forth above, the opening through the panel may be prepierced or punched prior to the installation of the fastener in the panel opening. Alternatively, the free end of the tubular barrel portion may be utilized to pierce the opening through the panel although this method may not be preferable for installing a fastener in a relatively thick or heavy metal panel. The method of this invention then includes driving the free open end of the tubular barrel portion through the panel opening against a substantially planar surface of a die member, coining and deforming the tubular barrel portion axially toward the panel and radially outwardly, forming a planar annular radial bearing surface bearing against the panel surrounding the panel opening. As set forth above, the method of attaching a fastener to a panel of this invention substantially eliminates cracking of the panel during installation and results in a very secure fastener and panel assembly.

In a preferred embodiment of the method of this invention, wherein the open free end of the tubular barrel portion is driven against a planar die surface, the method of this invention includes forming a planar annular end face on the annular barrel portion which conforms to the planar die surface which, in the disclosed embodiment, is generally parallel to the planar annular radial bearing surface forming a very rugged assembly. In one preferred embodiment of the method of this invention, wherein the self-attaching fastener includes a radial flange portion, the radial flange portion is driven into the opening formed through the panel engaging the inner surface of the panel opening. As described further below, wherein the die member includes a center post or land, the diameter of the land is preferably generally equal to or slightly less than the internal diameter of the tubular barrel portion, wherein the method of this invention includes aligning the tubular barrel portion with the central die post or land. Further, in one preferred embodiment of the die member or die button, the die button further includes an annular surface surrounding the moat or die surface spaced above the plane of the planar surface of the moat, wherein the method of this invention includes supporting the panel on the surface surrounding the moat.

The die member of this invention for attaching a self-attaching fastener having a fastener portion and an integral tubular barrel portion having a free open end to a panel includes a central die post or land having a diameter generally equal to or less than the inner diameter of the open end of the tubular barrel portion configured to receive the free open end of the tubular barrel portion, a moat or trough having a planar die surface extending generally perpendicular to an axis of the central die post surrounding the central die post spaced below a free end of the central die post adapted to coin and deform the tubular barrel portion axially and radially as described above, and a planar panel support surface surrounding the annular die surface spaced above a plane of the planar die surface. As will be understood by those skilled in this art, the preferred embodiment of the die member or die button of this invention is significantly less expensive than the die buttons disclosed in the above-referenced U.S. Pat. No. 4,915,558. As will be understood, the planar die surface may be more easily formed than the annular concave hemispherical surface disclosed in the above-referenced patent and is less subject to damage or wear. Further, lubrication of the tubular barrel portion is not required in most applications because the tubular barrel portion is not rolled and inverted in an annular hemispherical die cavity as described above and disclosed in the above-referenced U.S. Pat. No. 4,915,558.

As will be understood by those skilled in this art and discussed further below, various modifications may be made to the self-attaching fastener and panel assembly, method of installation and die member of this invention within the purview of the appended claims. The embodiments of this invention disclosed in the following description of the preferred embodiments and drawings are for illustrative purposes only and thus do not limit the scope of this invention. Other advantages and meritorious features of this invention will be more fully understood from the following description of the preferred embodiments of the self-attaching fastener and panel assembly, method of installation and improved die member, the appended claims and the drawings, a brief description of which follows.

BRIEF DESCRIPTION OF THE DRAWINGS

FIG. 4 is a side partially cross-sectioned view of FIG. 3 during installation of the self-attaching fastener in a panel;

FIG. 5 is a side partially cross-sectioned view of the installation apparatus shown in FIGS. 3 and 4 with the self-attaching fastener installed in a panel;

FIG. 6 is a top perspective view of the die member shown in FIGS. 3 to 5;

FIG. 7 is a side cross-sectional view of the die member shown in FIGS. 3 to 6;

FIG. 8 is an end perspective view of an alternative embodiment of a female self-attaching fastener which may be utilized to form the self-attaching fastener and panel assembly of this invention utilizing the method of installation and die member, of this invention;

FIG. 9 is a side partially cross-sectioned view of the female self-attaching fastener shown in FIG. 8 aligned in an installation apparatus for installing the self-attaching fastener in a panel; and FIG. 10 is a side partially cross-sectioned view of the self-attaching fastener installed in a panel.

DESCRIPTION OF THE PREFERRED EMBODIMENTS

Figure 1:
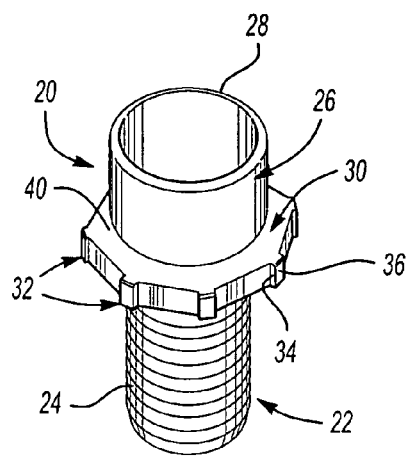
FIG. 1 is an end perspective view of one embodiment of a male self-attaching fastener which may be utilized to form the self-attaching fastener and panel assembly of this invention with the method of installation of this invention.
Figure 2:
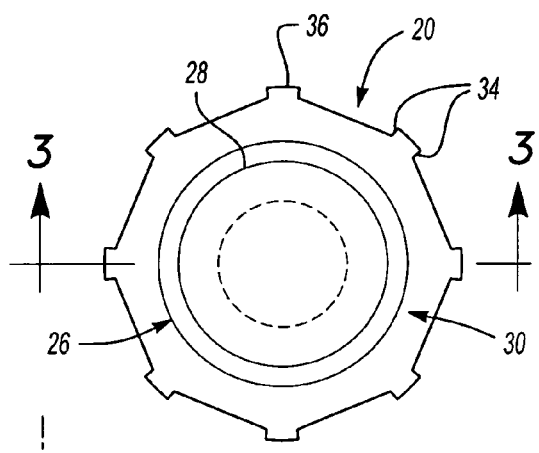
FIG. 2 is an end view of the self-attaching fastener shown in FIG. 1.

As set forth above, and discussed further hereinbelow, the embodiments of the self-attaching fastener and panel assembly, method of installing a self-attaching fastener in a panel and die member of this invention are disclosed for illustrative purposes only and do not limit this invention except as set forth in the appended claims. FIGS. 1 and 2 illustrate one preferred embodiment of a male self-attaching fastener which may be utilized in forming a self-attaching fastener and panel assembly of this invention utilizing the method of installation of this invention. As also set forth above, one advantage of the method of installation and die member of this invention is that a "conventional" self-attaching fastener may be utilized to form the self-attaching fastener and panel assembly of this invention. The embodiment of the self-attaching fastener shown in FIGS. 1 and 2 may be substantially identical to the embodiment of the self-attaching fastener shown in co-pending U.S. patent application Ser. No. 10/961,803 filed Oct. 8, 2004, the disclosure of which is incorporated herein by reference. Alternatively, as discussed hereinbelow, the self-attaching fastener may be identical to the self-attaching fasteners disclosed in the above-referenced U.S. Pat. No. 4,543,701 or 4,915,558.

The self-attaching fastener 20 shown in FIGS. 1 and 2 includes a fastener portion 22 which, in the disclosed embodiment, is an externally threaded shank 24, a tubular barrel portion 26 having an open free end 28 and a radial flange portion 30. In a preferred embodiment, the tubular barrel portion 26 is coaxially aligned with the radial flange portion 30 and the fastener portion 22 as an integral assembly. The shank portion 24 may also be unthreaded for receipt of a thread forming or thread rolling female fastener or other means for attachment to another member, such as a ball joint. In the disclosed embodiment of the fastener 20, the radial flange portion 30 includes a plurality of circumferentially spaced radial teeth 32 on an outer surface of the radial flange portion 30. In the disclosed embodiment, the radial teeth 32 include radial side faces 34 and planar end faces 36 as best shown in FIG. 2. However, as disclosed in the above-referenced co-pending U.S. application Ser. No. 10/961,803 filed Oct. 8, 2004, the radial teeth 32 may have various shapes and as discussed further hereinbelow, the radial teeth are optional. That is, other means may be provided to prevent relative rotation between the self-attaching fastener 20 in a panel following installation.

Figure 3:
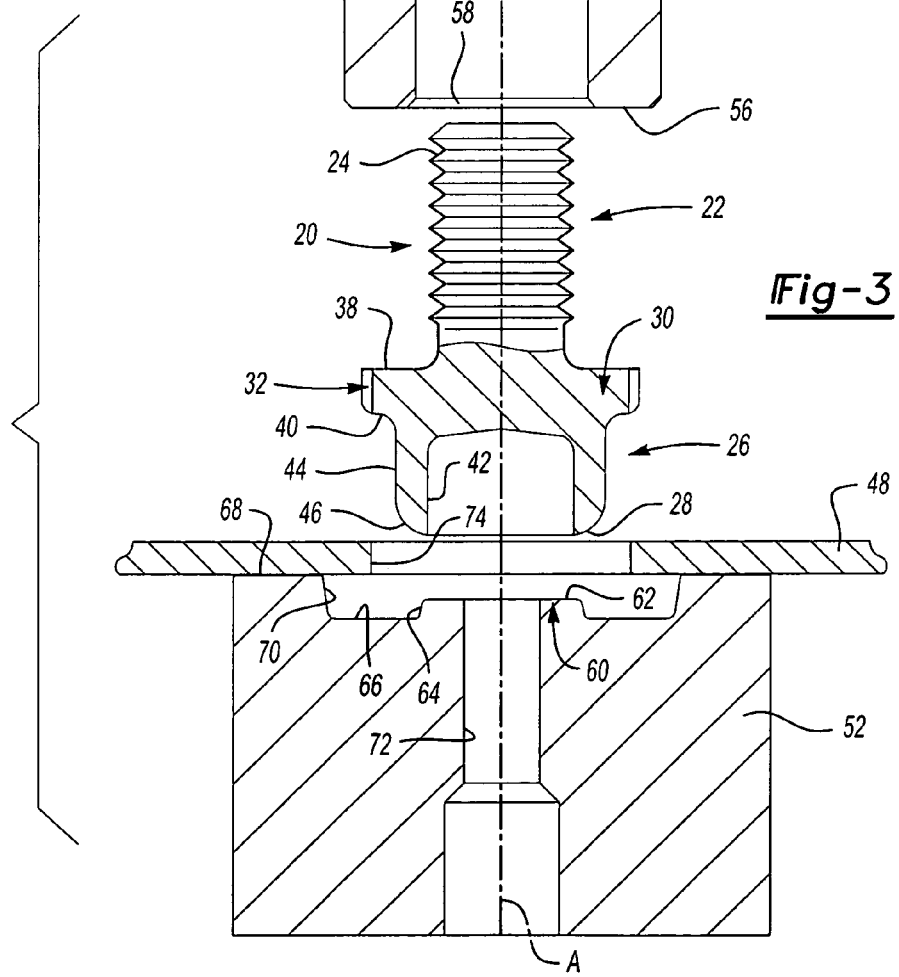
FIG. 3 is a side partially cross-sectioned view of the self-attaching fastener shown in FIGS. 1 and 2 aligned for installation in a panel in an installation apparatus with the die member of this invention.

As best shown in FIG. 3, the radial flange portion 30 includes an annular bearing or driven face 38 surrounding the barrel portion 26 and an opposed annular drive face 40. In a preferred embodiment of the self-attaching fastener 20, the radial flange portion 30 has a diameter greater than the fastener portion 22 and the tubular barrel portion 26. In the disclosed embodiment of the self-attaching fastener 20, the tubular barrel portion 26 includes a cylindrical internal surface 42, a coaxially aligned cylindrical outer surface 44 and an arcuate outer driven surface 46 adjacent the open free end 28. Alternatively, the internal or outer surfaces 42 and 44 may be frustoconical depending upon the application.

FIG. 3 illustrates one preferred embodiment of an installation apparatus for installing a male fastener element, such as the self-attaching fastener 20 in a panel 48. In a typical application, the panel 48 is a steel panel such as used by the automotive industry for mass production applications. However, the panel 48 may be any material, such as aluminum, aluminum alloys or even plastic. The installation apparatus shown in FIG. 3 includes a plunger 50 and a die member or die button 52. In the disclosed embodiment shown in FIG. 3, the plunger 50 includes a cylindrical opening or bore 54 configured to receive the fastener portion 22 of the self-attaching fastener 20 having an annular drive face 56 adapted to be driven against the annular bearing or driven face 38 of the radial flange portion 30. In the disclosed embodiment, the bore 54 of the plunger 50 includes a frustoconical counterbore 58 adjacent the drive face 56. The die button 52 in the disclosed embodiment includes a central die post 60 having a planar end or annular top face 62 and a frustoconical side face 64. The end or top face 62 is commonly referred to as the land. In a preferred embodiment of the die button 52, the bottom or die surface 66 is planar and extends substantially perpendicular to the longitudinal axis "A" of the die button. The die cavity surrounding the die post 60 is commonly referred to as the trough or moat. In one preferred embodiment, the die button 52 includes an annular planar bearing surface 68 which supports the panel 48 during installation as shown in FIG. 3. In a typical application, the panel 48 will be secured to the annular planar bearing surface 68 by clamps or other securement means. As described further hereinbelow, the outer face 70 of the moat or trough of the die button 52 may have any configuration because the tubular barrel portion 26 preferably does not engage the outer surface 70 during installation, but is permitted to flow radially outwardly without restriction. In the disclosed embodiment, the outer face 70 is frustoconical. In a preferred embodiment, the die button 52 further includes a central bore 72 which permits escape of air during installation.

As shown in FIG. 3, the first step of the method of installing a fastener 20 in a panel 48 is to align the self-attaching fastener 20 with the die button 52 along axis A, such that the tubular barrel portion 26 is aligned with the center post 60 of the die button and the side face 64 of the center post 60 is configured to receive the internal surface 42 of the tubular barrel portion 26. As will be understood by those skilled in this art and as disclosed in the above-referenced U.S. Pat. No. 4,915,558, self-attaching fasteners 20 are typically received in an installation head having a plunger 50, wherein the installation head (not shown) is secured in the upper die shoe or die platen of a die press and the die button 52 is secured in the lower die shoe or die platen of a die press (not shown). However, the self-attaching fastener 20 may be installed in a panel 48 in any type of press. As described further hereinbelow, it is believed that the self-attaching fastener 20 may be utilized to pierce an opening in the panel 48 during the installation of the self-attaching fastener 20 in a panel 48. However, in the embodiment of the method disclosed herein, an opening 74 is preformed, pierced or punched from the panel having an internal diameter greater than the diameter of the outer surface 44 of the tubular barrel portion 26, but less than the outer diameter of the radial flange portion 30. In a typical application, the fastener portion 22 of the self-attaching fastener 20 is first received in the bore 54 of the plunger 50 in the installation head (not shown) and the plunger, which may be fixed to the upper die shoe or die platen of a press (not shown) is driven toward the die button 52 and the panel 48 supported on the annular planar bearing surface 68 of the die button as the press is closed. As set forth above, however, this arrangement may be reversed, wherein the die button 52 is fixed in the upper die shoe or die platen or the installation may be horizontal in any type of press.

The free end 28 of the tubular barrel portion 26 is then driven through the opening 74 in the panel 48 and against the planar die surface 66 of the trough or moat of the die button 52 by the plunger 50 as shown in FIG. 4. Because the bottom surface 66 of the moat or trough of the die button 52 is planar and substantially perpendicular to the longitudinal axis A of the die button, the free end 28 of the tubular barrel portion is coined or deformed axially toward the radial flange portion 30. Further, because the outer surface 64 of the center post 60 prevents radially inward deformation, the free end 28 of the tubular barrel portion 26 is simultaneously deformed radially outwardly as shown at 28a in FIG. 4. As will be understood by those skilled in this art, the free end 28 of the tubular barrel portion 26 is compressed beyond its yield point as the tubular barrel portion 26 is driven against the planar die surface 66. Further, the free end 28 is flattened against the planar die surface 66.

Finally, as shown in FIG. 5, continued coining and flattening of the barrel portion 26 against the planar bottom wall 66 of the trough or moat or the die button 52 forms a substantially planar radial surface 76 which is deformed or coined radially beneath the panel 48 surrounding the panel opening 74 which is driven against the panel face 48a as shown in FIG. 5. The free open end 28 of the tubular barrel portion 26 shown in FIG. 3 is also flattened, forming a planar end face 78 which is parallel to the planar radial surface 76 which supports the panel 48. The air entrapped in the confined space 80 shown in FIG. 4 is allowed to escape through the bore 72.

As shown in FIG. 5, in a preferred embodiment of the self-attaching fastener and panel assembly, the annular barrel portion 26 may have a width "W" or thickness greater than the radial flange portion 30 providing a very rugged and secure installation. Further, the coined annular barrel portion 26 may be spaced from the radial flange portion 30, such that panel metal 48b is deformed radially between the radial flange portion 30 and the annular barrel portion 26 as shown in FIG. 5 providing greater push-off strength. Further, because the radial flange portion 30 has a greater diameter than the opening 74 through the panel 48, the radial flange portion is driven into the panel providing further push-off strength. Where the radial flange portion 30 includes radial teeth 32 as shown in FIGS. 1 and 2, the radial teeth (not shown in FIG. 5) are driven into the panel preventing rotation of the self-attaching fastener 20 and the panel 48 following installation. It is also important to note that the barrel portion 26 is not deformed radially into contact with the outer face 70 of the moat of the die button 52 as shown in FIG. 5. That is, the radial deformation of the annular barrel portion 26 is permitted to deform radially unrestrained in the trough or moat of the die button 26, such that the outer surface 82 of the annular barrel portion 26 does not engage the outer face 70 of the moat of the die button. However, because the radial deformation of the annular barrel portion 26 is unrestrained and deformed against the planar die face 66, the outer surface 82 is frustoconical as shown in FIG. 5.

FIGS. 6 and 7 illustrate one preferred embodiment of the die button 52 described above. The die button 52 may include a cylindrical outer surface adapted to be received in a cylindrical opening in the lower die platen (not shown) to securely retain the die button in the die shoe. The die button includes an annular panel support face 68, a central die post 60 having an end face 62 and a frustoconical side face 64. The annular bottom face 66 of the moat or trough 86 surrounding the die post 60 is preferably substantially planar and extends perpendicular to the longitudinal axis A of the die button 52. In the disclosed embodiment of the die button 52, the outer face 70 of the moat 86 is frustoconical to conform to the frustoconical outer surface 82 of the annular barrel portion 26 as shown in FIG. 5, but may be any shape which preferably does not restrict the radial coining and radial deformation of the annular barrel portion 26. Further, a preferred embodiment of the die button 52 includes an axial bore 72 to permit the escape of air as described above. The die button 52 is preferably formed of a hardened steel and the bottom surface 66 may be polished, but polishing will not be required in many applications. As will be understood by those skilled in this art, the die button 52 is substantially less expensive than the die buttons disclosed in the above-referenced U.S. patents and co-pending application, the die button 52 is substantially easier to manufacture and less subject to wear.

FIGS. 8 to 10 illustrate a female self-attaching fastener 120 which may be utilized to form a self-attaching fastener and panel assembly by the method of installation of this invention and utilizing the die button 52 described above. Because many of the elements of the female self-attaching fastener 120 are the same as the male self-attaching fastener 20 described above, the common elements have the same reference numbers as the male self-attaching fastener 20 except 100 is added to the reference numbers of the male self-attaching fastener 20. The female self-attaching fastener 120 includes a fastener portion 122 which, in the disclosed embodiment, is a bore which is internally threaded as shown at 124 in FIGS. 9 and 10. However, the bore may be unthreaded to receive a male thread forming or thread rolling fastener, such as a stud. The female self-attaching fastener 120 further includes a tubular barrel portion 126 having an open free end 128. However, in this embodiment, the internal surface 142 is cylindrical and the outer surface 144 includes a frustoconical surface 145. Further, the internal surface 142 includes a frustoconical surface 143 adjacent the free end 128. The female self-attaching fastener 120 further includes a radial flange portion 130. However, in this embodiment, the radial flange portion does not include radial teeth 32 shown in FIGS. 1 and 2. Torque resistance may be provided by any suitable means including ribs (not shown) on the frustoconical outer surface 145 or the outer surface of the female self-attaching fastener 120 may be polygonal. In this embodiment, the annular end surface 138 of the radial flange portion 130 is planar to receive a plunger 150 having a planar end face 156 as shown in FIG. 9. Thus, the female self-attaching fastener 120 may be substantially identical to the female fastener disclosed in the co-pending application Ser. No. 10/961,803 referenced above. Alternatively, the flange portion 130 may include radial teeth as disclosed in the referenced co-pending application.

The method of installing the self-attaching female fastener 120 shown in FIGS. 9 and 10 may be identical to the method described above. That is, the self-attaching female fastener is first aligned with the die button 52 having a planar bottom die surface 66 substantially perpendicular to the longitudinal axis A and a central die post having an outer surface 64 coaxially aligned with the tubular barrel portion 126, wherein the diameter of the outer surface 64 is generally equal or slightly smaller than the diameter of the cylindrical internal surface 142. The panel 188 is supported on the annular planar bearing surface 68 of the die button 52 as described above and the free end 128 of the tubular barrel portion 126 is driven through the panel opening 180 against the planar die surface 66 of the die button 52 by the plunger 150. In this embodiment, the opening 180 through the panel 188 is greater than the diameter of the free open end 128 of the pilot portion 126, but less than the major diameter of the outer frustoconical surface 145. Of course, it is also less than the diameter of the radial flange portion 130. As described above with regard to FIGS. 9 and 10, as the free end 128 of the tubular barrel portion 126 is driven against the planar bottom wall 66 of the die button 52, the barrel portion 126 is coined and deformed against the planar die surface 66 axially and radially forming a planar radial surface 176 which is deformed beneath and against the surface 188*a* of the panel 188 and the end surface 178 is deformed into a planar end face 178 forming a very secure installation. In this embodiment, however, the panel 188*b* is deformed beneath the frustoconical surface 145 of the barrel portion, providing further push-off strength. As described above, inward radial deformation is prevented by the outer surface 64 of the central die post 60 shown in FIG. 9. As also described above, the outer surface 182 of the annular barrel portion 166 is not restrained by the outer surface 70 of the die button. Thus, the method of installing the female self-attaching fastener 120 may be the same as the method of installing the male self-attaching fastener 20 and thus no further description of the method is required.

As will be understood by those skilled in this art, various modifications may be made to the disclosed embodiments of the self-attaching fastener and panel assembly, method of installation and die member of this invention within the purview of the appended claims. Although a preferred embodiment of the method of installing a self-attaching fastener in a panel of this invention includes performing an opening in the panel prior to installation which permits installation of the self-attaching fastener in thicker or heavier panels, it is believed that the self-attaching fastener may also be utilized to pierce an opening in the panel as disclosed in the above-referenced U.S. patents. However, this method of installation may require a separate reciprocable die post as disclosed in the above-referenced U.S. Pat. No. 4,543,701. That is, the die post 60 may be formed as a separate element and movable relative to the remainder of the die button. Further, as described above, various anti-rotation means may be utilized to prevent relative rotation of the self-attaching fastener to the panel following installation and thus the radial teeth 32 extending from the radial flange portion 30 are optional, but preferred in many installations. Further, because the tubular barrel portion is not deformed against a concave annular hemispherical die surface to invert the free end of the barrel portion into an annular hook-shape as disclosed in the above-referenced U.S. Pat. No. 4,915,558, the substantial frictional resistance is eliminated, permitting the use of various shaped tubular barrel portions including, for example, polygonal-shaped tubular barrel portions. The barrel portion may also be oval-shaped or other shapes depending upon the application. Further, as described above, any type of self-attaching fastener may be utilized, including male and female self-attaching fasteners provided the self-attaching fastener includes a fastener portion and a tubular barrel portion. A self-attaching fastener having a radial flange portion is also preferred, but a radial flange portion is not required. Further, as described above, the installation apparatus will depend upon the application and any type of press may be utilized, including a horizontal press or a press wherein the die button 52 is located in the upper die platen.

As set forth above in the summary of the invention, the self-attaching fastener and panel assembly, method of installation and die button of this invention have several important advantages over the prior art, including the above-referenced U.S. patents. The method of installation of this invention is particularly, but not exclusively, for mass production applications such as utilized by the automotive industry. Further, one or a plurality of self-attaching fasteners may be installed with each stroke of a die press, wherein the panel is also formed to a desired shape. The self-attaching fastener and panel assembly and method of installation of this invention substantially eliminates cracking of the tubular barrel during installation. Further, as described above, the method of installing a self-attaching fastener of this invention eliminates the very substantial frictional resistance of the concave annular hemispherical die surface as the free end of the tubular barrel portion is deformed into an inverted hook-shape as disclosed in the above-referenced U.S. Pat. No. 4,915,558, thereby eliminating cracking of the barrel and significantly reducing the cost of the die button. Having described the preferred embodiments of the self-attaching fastener and panel assembly, method of installation and die button of this invention, the invention is now claimed as follows.

The invention claimed is:

1. A method of attaching a self-attaching fastener to a panel, comprising the following steps:
    forming a self-attaching fastener including a fastener portion and an integral tubular barrel portion having a free open end;
    receiving the tubular barrel portion of said fastener through an opening in a panel; and
    driving said free end of said tubular barrel portion against a substantially planar surface of a die member, flattening said free end, deforming said tubular barrel portion axially, thereby reducing an axial length of said tubular barrel portion and radially deforming said barrel portion axially toward said panel and forming a planar annular radial bearing surface bearing against said panel surrounding said opening through said panel as said free end of said tubular barrel portion is deformed.

2. The method as defined in claim 1, wherein the step of deforming said free end of said tubular barrel portion is further defined by deforming said barrel portion substantially radially outwardly.

3. The method as defined in claim 1, wherein said method includes forming an opening through said panel, then receiving said tubular barrel portion through said opening in said panel.

4. The method as defined in claim 1, wherein said self-attaching fastener includes a radial flange portion integral and coaxially aligned with said fastener portion having a diameter greater than said fastener portion, said radial flange portion including an annular surface surrounding said fastener portion, and said method including driving a plunger against said annular surface of said radial flange portion, thereby driving said free end of said tubular barrel portion against said substantially planar surface of said die member.

5. The method as defined in claim 1, wherein said die member includes a central post having an outside diameter generally equal to an inner diameter of said free end of said tubular barrel portion and a planar die surface surrounding said central post, said method including aligning said free end of said tubular barrel portion with said central post with said free end of said tubular barrel portion opposite said planar surface of said die member.

6. The method as defined in claim 1, wherein said method includes forming said self-attaching fastener including a cylindrical shank portion defining said fastener portion and a radial flange portion integral with and surrounding said shank portion.

7. The method as defined in claim 1, wherein said die member includes a panel support surface surrounding said substantially planar die surface and spaced above a plane of said planar die surface, said method including supporting a panel on said panel support surface of said die member.

8. A method of attaching a self-attaching fastener to a panel, comprising the following steps:
    forming a fastener having a fastener portion and a tubular barrel portion integral and coaxially aligned with said fastener portion having a free open end;
    forming an opening through a panel having a diameter equal to or greater than said tubular barrel portion;
    supporting said panel on a panel support surface of a die member surrounding a substantially planar die surface spaced below a plane of said panel support surface; and
    driving said free open end of said tubular barrel portion through said opening in said panel against said substantially planar die surface coining and deforming said tubular barrel portion axially and radially outwardly forming a substantially planar end face and a substantially planar annular radial bearing surface having a diameter greater than said fastener portion and said opening through said panel bearing against said panel surrounding said opening through said panel.

9. The method as defined in claim 8, wherein said method includes forming a self-attaching fastener having a radial flange portion integral and coaxially aligned with said fastener portion and said tubular barrel portion having a diameter greater than said tubular barrel portion and driving a plunger against said annular surface of said radial flange portion, thereby driving said free end of said tubular barrel portion against said planar surface of said die member.

10. The method as defined in claim 8, wherein said die member includes a central die post extending from said substantially planar die surface having an outer diameter equal to or less than an inner diameter of said free end of said tubular barrel portion configured to receive said free end of said tubular barrel portion, said method including aligning said free end of said tubular barrel portion with said central die post.

11. The method as defined in claim 8, wherein said method includes forming said self-attaching fastener including a cylindrical shank portion defining said fastener portion and a radial flange portion integral with and surrounding said shank portion.

12. A die member for attaching a self-attaching fastener having a fastener portion and an integral tubular barrel portion having a free open end to a panel, comprising:
    a central die post having an outer diameter equal to or less than an inner diameter of said free open end of said tubular barrel portion configured to receive said free open end of said tubular barrel portion;
    a planar die surface extending perpendicular to an axis of said central die post surrounding said central die post spaced below a free end of said central die post adapted to coin and deform said tubular barrel portion axially and radially outwardly; and
    a planar panel support surface surrounding said planar die surface spaced above a plane of said planar die surface.

* * * * *